No. 740,140. PATENTED SEPT. 29, 1903.
T. P. KEENAN.
HEATER, RADIATOR, OR STOVE.
APPLICATION FILED NOV. 4, 1902.
NO MODEL.

WITNESSES:
William Miller
Chas. E. P. Vusgen

INVENTOR
Thomas P. Keenan
BY W. C. Hauff
ATTORNEY

No. 740,140. Patented September 29, 1903.

UNITED STATES PATENT OFFICE.

THOMAS P. KEENAN, OF BROOKLYN, NEW YORK, ASSIGNOR OF ONE-HALF TO FREDERICK W. SPARKS, OF BROOKLYN, NEW YORK.

HEATER, RADIATOR, OR STOVE.

SPECIFICATION forming part of Letters Patent No. 740,140, dated September 29, 1903.

Application filed November 4, 1902. Serial No. 130,051. (No model.)

*To all whom it may concern:*

Be it known that I, THOMAS P. KEENAN, a citizen of the United States, residing at Brooklyn borough, New York city, in the county of Kings and State of New York, have invented new and useful Improvements in Heaters, Radiators, or Stoves, of which the following is a specification.

By means of this invention thorough consumption of combustible and effective heating can be obtained, as set forth in the following specification and claims and illustrated in the annexed drawings, in which—

Figure 1:
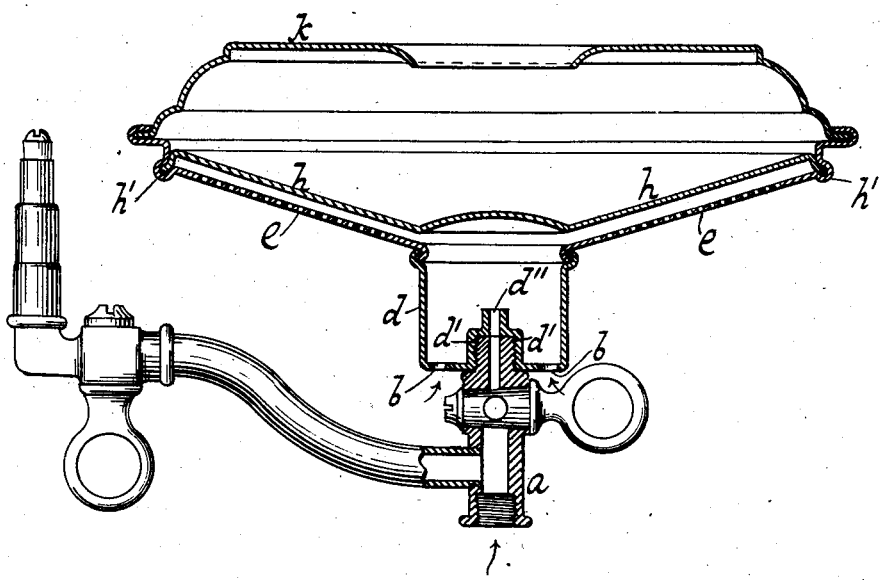
Figure 2:
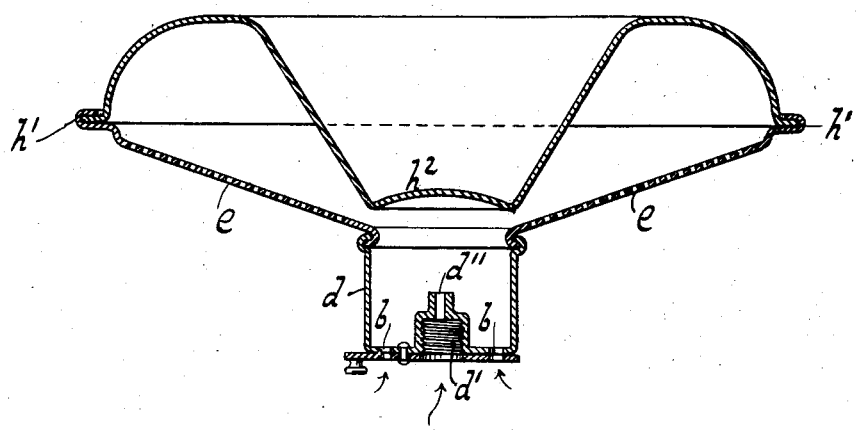

Figure 1 is a sectional side elevation of a heater embodying this invention. Fig. 2 shows a modification.

In the drawings, Fig. 1 is shown what may be called a "conical" chamber or wall $e$. This wall $e$ has exit-slots or burner-openings for the combustible or mixture, which being ignited will produce a layer or sheet of flame.

A deflector $h$ is shown, having its edge beaded or secured to the interior of the wall $e$ below the upper edge of the latter and above the flame-openings. This beading or fastening is indicated at $h'$. The central or lowermost portion of deflector $h$ is indicated as dome-shaped or somewhat curved up from flat position. This dome shape, it has been found, tends to secure a more even distribution of gas or combustible between the walls $e$ and $h$. The gas coming from the supply pipe or bracket $a$ and rising into the dome part at the center of deflector $h$ will from thence spread toward or pass out of the burner-openings. It has been found that this dome or cup shape at the center of the deflector tends to secure an even distribution of gas even if the device should be somewhat tilted or not exactly level.

The device is provided with a mixing chamber or wall $d$, having an entrance or threaded attaching portion $d'$ for the feed or inlet pipe $a$. The inlet nipple or part $d''$, leading into the chamber, is of reduced area or diameter as compared with the attaching portion or with pipe $a$.

The perforated air-supply portion having the inlet-openings $b$ is made to surround the attaching portion $d'$. This chamber $d$, with parts $d'$ $d''$, can be readily or cheaply formed of one piece of material, if desired. Sheet metal or brass has been found serviceable for forming this mixing-chamber. When the air-openings $b$ are suitably proportioned to the area of the flame-openings in wall $e$, the required blue flame or thorough combustion is assured even under varying conditions of pressure.

The device is shown with a top piece $k$, secured to the wall $e$ or beaded to the upper edge of said wall. This top piece can have a hole or heat-escape opening to expose the deflector $h$.

The gas-supply pipe $a$, if desired, can have a burner-tip to serve for illumination as well as for heating.

In the modification shown in Fig. 2 the deflector $h^2$ is shown as extended more or less across the top of the device, so as to form a top without requiring a separate piece, as shown at $k$, Fig. 1.

What I claim as new, and desire to secure by Letters Patent, is—

1. A heating device having a conical wall with flame-exits, and a deflector inside the wall, said deflector having a dome-shaped central or reservoir portion to secure an even distribution of gas.

2. A heating device having a conical wall with flame-exits, a deflector having a dome-shaped central portion, and a top portion with an opening to expose the central portion of the deflector.

In testimony whereof I have hereunto set my hand in the presence of two subscribing witnesses.

THOMAS P. KEENAN.

Witnesses:
   E. F. KASTENHUBER,
   CHAS. E. POENSGEN.